(No Model.)

5 Sheets—Sheet 1.

M. JENSEN.
CAN FILLING MACHINE.

No. 281,767. Patented July 24, 1883.

Witnesses,
Geo. H. Strong.

Inventor
M. Jensen
Dewey & Co.
Attorneys (No Model.)  5 Sheets—Sheet 2.

M. JENSEN.
CAN FILLING MACHINE.

No. 281,767. Patented July 24, 1883.

Witnesses,
Geo. H. Strong.
J. H. Krouse.

Inventor
M. Jensen
By Dewey & Co.
Attorneys (No Model.)

M. JENSEN.
CAN FILLING MACHINE.

No. 281,767.       5 Sheets—Sheet 3.

Patented July 24, 1883.

Witnesses:
Geo. H. Strong.
J. H. Nourse.

Inventor
M. Jensen
By Dewey & Co.
Attorneys (No Model.)　　　　　　　M. JENSEN.　　　　5 Sheets—Sheet 4.
CAN FILLING MACHINE.
No. 281,767.　　　　　　　　　Patented July 24, 1883.
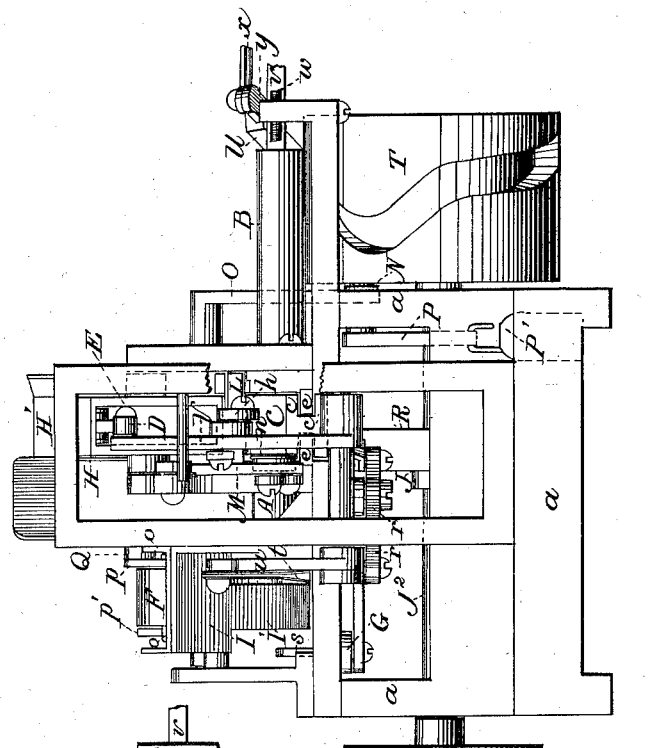
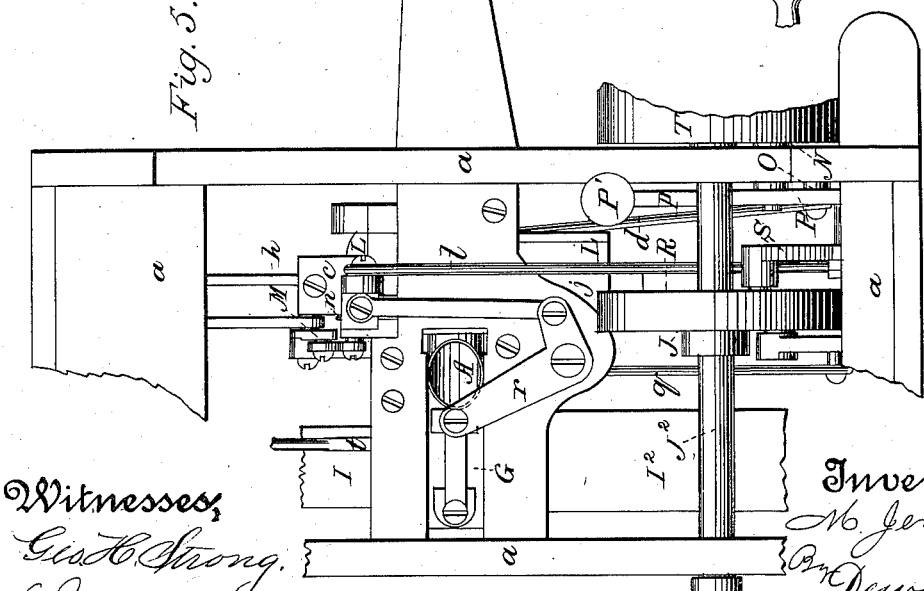
Witnesses:
Geo. H. Strong.
G. H. Rouse.
Inventor
M. Jensen
By Dewey & Co.
Attorneys (No Model.)   M. JENSEN.   5 Sheets—Sheet 5.

CAN FILLING MACHINE.

No. 281,767.   Patented July 24, 1883.

Witnesses,
Geo. H. Strong.
G. H. Strouse

Inventor
M. Jensen
By Dewey & Co.
Attorneys

UNITED STATES PATENT OFFICE.

MATHIAS JENSEN, OF ASTORIA, OREGON, ASSIGNOR OF SEVENTEEN TWENTY-SIXTHS TO ANDREW T. BRAKKE AND MARSHAL J. KINNEY, OF SAME PLACE, AND SYLVESTER FARRELL, OF PORTLAND, OREGON.

CAN-FILLING MACHINE.

SPECIFICATION forming part of Letters Patent No. 281,767, dated July 24, 1883.

Application filed April 17, 1883. (No model.)

*To all whom it may concern:*

Be it known that I, MATHIAS JENSEN, of Astoria, county of Clatsop, State of Oregon, have invented an Improved Can-Filling Machine; and I hereby declare the following to be a full, clear, and exact description thereof.

My invention relates to an improved machine for filling cans with fish preparatory to sealing the same; and it consists in a means for automatically supplying the fish and shaping it to enter the can, and a means for supplying the cans and adjusting them to the filling spout or nozzle, compressing the fish into them, and finally removing them, ready to be capped, and in certain details of mechanism and construction, all of which will be more fully explained by reference to the accompanying drawings, in which—

Figure 1:
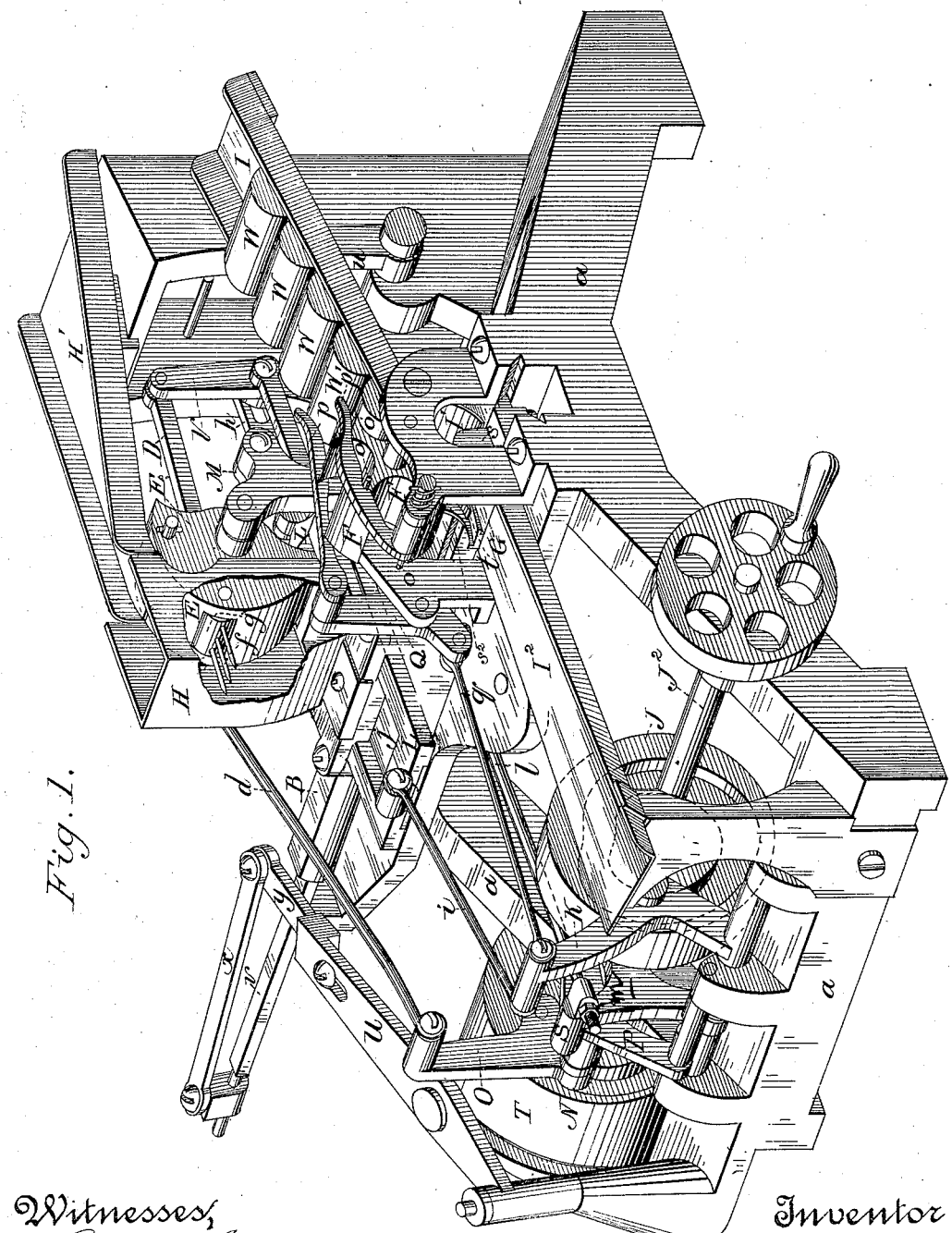
Figure 2:
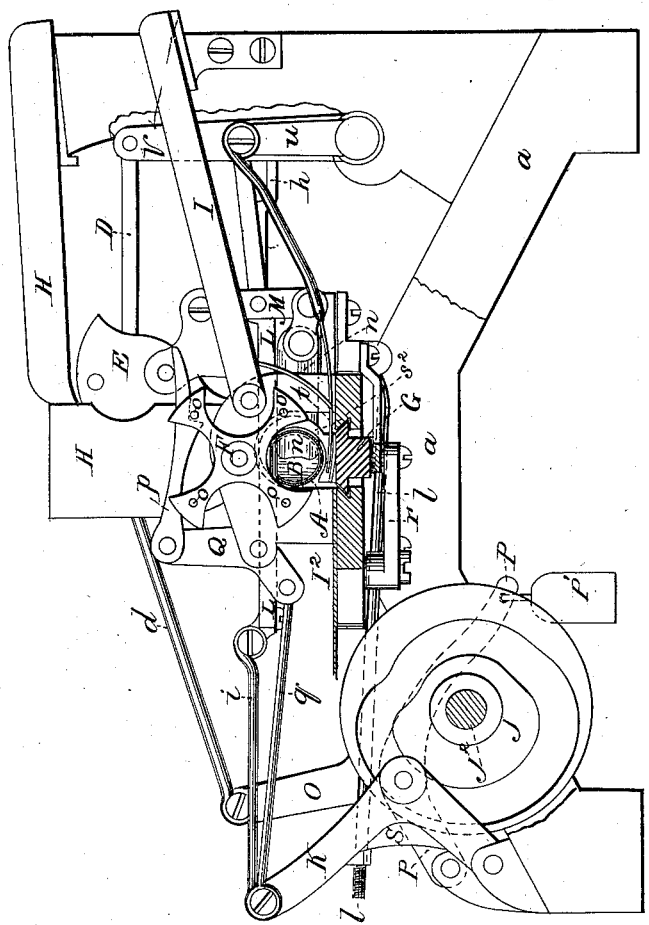
Figure 7:
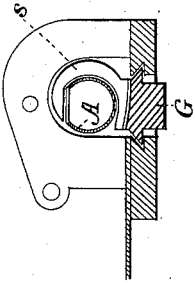
Figure 3:
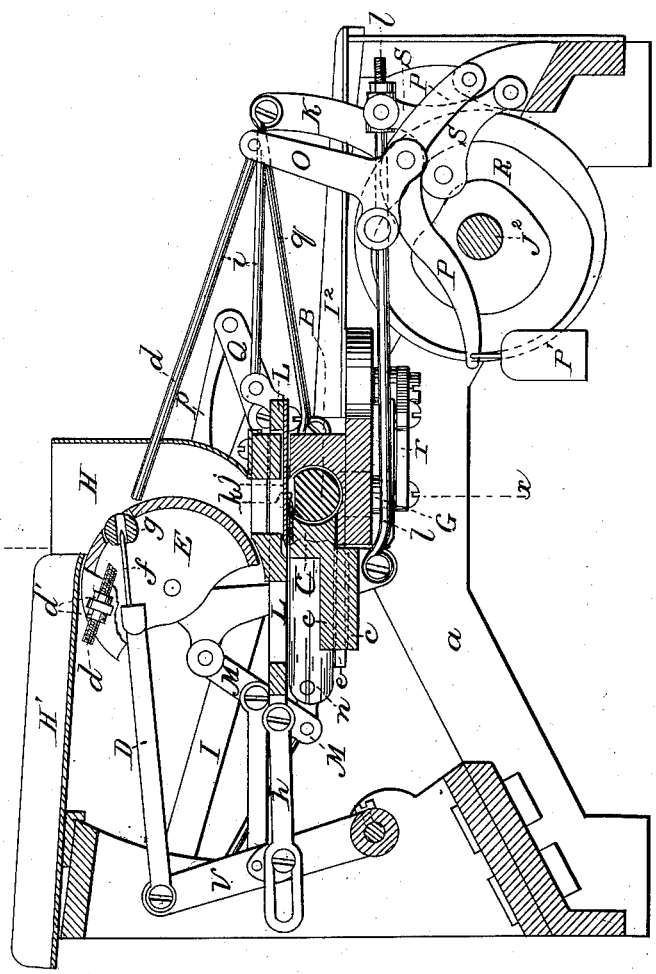
Figure 6:
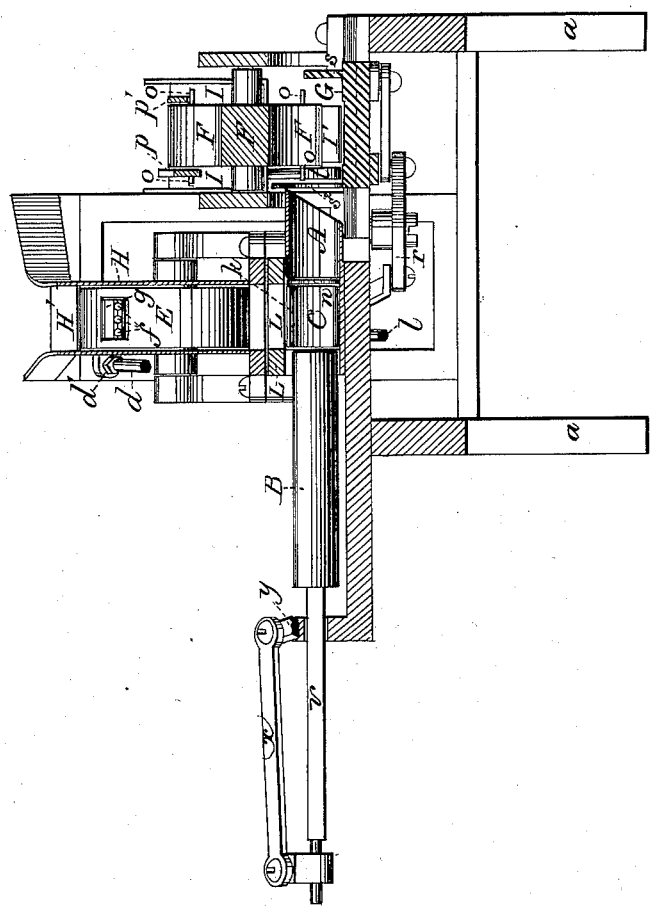

Figure 1, Sheet 1, is a perspective view of my apparatus. Fig. 2, Sheet 2, is a side elevation with outer supporting-stand left off and section across main shaft, showing also end of rotary can-supplying device. Fig. 3, Sheet 3, is a longitudinal section. Fig. 4, Sheet 4, is an end elevation. Fig. 5, Sheet 4, is a bottom view of the apparatus. Fig. 6, Sheet 5, is a transverse section through $x\ x$, Fig. 3. Fig. 7 is a view of the device for removing the can from filling-tube.

$a$ is a frame upon which the various mechanisms and driving-shafts are supported.

H' is a chute into which the fish in suitable pieces is placed, and is moved forward into the hopper H. The front of this hopper is curved, as shown, and in the rear is hinged or pivoted a back, E, having a curved semicircular face, which is caused to rotate up and down in the rear of the hopper by a cam, N, acting upon a lever-arm, O, which is connected with the rotating block E, above its center of oscillation, by a connecting-rod, $d$. The vertically-oscillating back E is hollow or open from behind, and an arm, D, extends forward from a rocker-arm, V, and enters the open rear portion of E. Long pointed forks $f$ project from the front of this arm D, passing through a roller, $g$, which is journaled within the part E and serves as a guide for the forks. This roller just projects through the curved face of E, so that these forks may be projected through it into the mass of fish within the hopper when the part E has reached its highest point in rotating upward. The arm D and the forks $f$ are thrown forward by the lever V, which is connected with the knife-carrying slide L by a rod, $h$, and this slide is reciprocated by a cam, J, acting upon a lever-arm, K, and a connecting-rod, $i$. The action of these parts is then as follows: The part E is rotated upward, and the forks $f$ are withdrawn by the lever V, so as not to project into the hopper while this upward movement takes place. As soon as the highest point is reached the lever V is thrown forward, carrying with it the arm D, and forcing the forks into the fish which fills the hopper. The part E is then rotated upon its axis, carrying the projecting forks downward while they remain within the hopper, so that they will force the fish which is beneath them into the measuring device or former below the hopper. The roller $g$, turning upon its axis as the part E oscillates up and down, adjusts itself to the relative position of the arm D and the forks $f$, which pass through it when they are at their highest or lowest positions.

As the amount of fish carried down by the forks or spikes may be more than the receiver will contain, it is necessary to provide a relief mechanism to prevent breakage of the parts. To do this one angle of the lever O carries a roller which traverses the cam-groove N, by which the oscillations of E are produced, and the other lower angle is pivoted to the horizontal arm P, which has a weight, P', suspended from one end, while the other end is pivoted to the frame. The pin or bolt by which the lever O is attached to the lever P thus forms the fulcrum about which the upper part of the lever O moves to elevate and depress the part E and the forks. After these forks have forced the fish down as far as it will go, a continuation of the movement will cause the forks to act as a fulcrum, and the action of the cam N upon the angular lever O will cause it to lift the lever P and its weight, so as to relieve the parts from strain. As this relief depends upon the lifting of a weight, instead of its gravitating downward, the machine may be run at a much higher rate of speed than in the latter case.

The connecting-rod $d$, between the lever O and the part E, is screw-threaded and provided with set-nuts $d'$, by which its length is changed and the oscillation of the part E varied either up or down.

Between the bottom of the hopper H and the measuring chamber or former are the horizontally-moving knives $j$ and $k$, by which an amount sufficient to fill a can is cut off after each depression of the forks in the hopper. The knife $j$ is bolted or otherwise attached to the slide L, which, as before described, is caused to reciprocate by the lever K and the cam J, and moves in from the front or side nearest the cam. The cam J and the other actuating-cams, hereinafter described, are mounted upon the main driving-shaft $J^2$. The other knife, $k$, is secured to the top of the movable rear wall, C, of the measuring-chamber, and is advanced with it from the rear, so as to pass beneath the cutter $j$. The edges of the cutters $j$ and $k$ are inclined, and the edges of both cutters are beveled toward each other, so that when they pass they cut like a pair of shears, and make a straight clean cut. Being straight blades, the knives are easily kept in order.

The measuring chamber or former, into which the fish is received from the hopper, is designed to give as nearly as possible an equal amount of fish for each can. Its bottom is a permanent plate. The top is formed by the reciprocating knives $j$ and $k$, as before described. The front is stationary and made concave, with a curve similar to the shape of the can. The rear wall is formed by the moving block C, to the top of which the knife $k$ is described as being secured. The interior face of this block is also concave, so that when the fish has been compressed into the measuring-chamber it will be in shape to be forced into the cans. This block C has plates $c$ extending out to the rear from its lower part, and these plates slide upon guides $e$, formed with or secured to the frame. From lugs beneath the block or plates a rod, $l$, extends forward, and is connected with one arm of a lever, S, another arm of which enters the cam-groove R and is moved by it, while the third arm is pivoted or journaled to the frame to act as a fulcrum. The position of the block C is adjusted to compress the fish in the chamber more or less by nuts $m$, which screw upon the screw-threaded end of the rod $l$, and this rod passes through a pin which turns in the end of the lever S, as shown. The forward movement of the block C takes place after the forks $f$ have carried the fish down into the measuring-chamber, and it thus compresses it and forces upward all surplus, which is then cut off by the advance of the knife $j$. Simultaneously with the advance of the arm D and the forks $f$, and before they begin to move downward, a gate, $n$, is moved across the open end of the measuring-chamber nearest the discharge-spout by a lever, M, which is connected with the lever V, so as to be actuated by that lever and its mechanism. The opposite end of the chamber is filled by the end of the reciprocating plunger B, so that when the fish is within the chamber and the knives have cut it off it is compressed into the proper form to be introduced into the can by the plunger B, and the charges will be as nearly as possible equal. This plunger B is caused to reciprocate by the cam T acting upon the lever U, from which a pin or roller projects into the cam-slot. The inner end of this lever is pivoted to the frame to form a fulcrum, and the outer end is connected with the plunger by adjustable connecting-rods, as will be described hereinafter. From the end of the measuring-chamber opposite the plunger B a spout, A, projects. This spout has its outer open end beveled off at an angle, so that the cans (which are often dented or bruised by handling) will be easily pressed upon the spout. The top of the spout is slightly flattened, so that the air within the can may escape as the fish is forced into it through the spout from the measuring-chamber, the upper elongated point of the spout extending nearly or quite to the bottom of the can when the latter has been slipped upon the spout.

The cans W are placed in an inclined chute, I, with their open ends toward the side nearest the spout A. From the lower end of the chute I a curved part, I', extends down to a horizontally-reciprocating plate, G, upon which the cans are received successively, and by which they are placed upon the spout A and removed therefrom. Above this plate G is a rotary feeder, F, by which the cans are received from the chute I and carried over the concave portion I' to the plate G. This feeder or carrier has four arms, with circularly-shaped spaces between them of a size to just allow a can to roll into each one as it arrives opposite the lower edge of the chute I, (shown in Fig. 1,) and the can is thus carried by the carrier down the concave portion I' to the plate G, where the carrier remains stationary until the car has been pressed upon the spout A, filled with fish, and removed, ready to be rolled out and down the discharge-spout $I^2$. The carrier resembles a cylinder of considerable thickness, having four semi-cylindrical openings bored out around its periphery, somewhat larger than the diameter of a can, and it is supported upon a shaft journaled in the frame of the machine. Each of the arms has a pin, $o$, projecting horizontally from each side near their outer ends. Arms $p$ $p'$ are supported upon pivots, so that they extend forward and rest upon the pins $o$, one upon each side of the carrier, as shown. The arm $p'$ has a notch upon its lower edge, which acts as a stop to prevent the carrier being rotated backward, the arm being held down by a spring. The arm $p$ has its rear end pivoted to a rocking arm or lever, Q, which is caused to oscillate by a connecting-rod, q, from the lever K, driven by the cam J, as before described. When the arm p is drawn back by the movement of the lever Q, a notch upon its lower edge engages one of the pins o, and when pushed forward it causes the carriers to rotate a distance equal to its stroke. The notch in the lever p' then engages a pin o upon the opposite side of the carrier, and holds it stationary while the arm p' is retracted for a new stroke. The stroke is of such a length that it moves the carrier one-fourth of a revolution each time, or as much as will present one space to receive a can from the chute at each stroke.

The plate or slide G, upon which the can is received from the carrier, is moved to and fro beneath the spout A by a lever, r, which is connected with it by a connecting-rod, and with the slides of the block C by another rod, so that it is moved simultaneously with this block. At the outer end of this plate G is a vertical standard, s, which presses against the bottom of the can and forces it upon the spout A when the plate G is advanced. Upon the opposite end of the plate is a ring-shaped standard, s', which has its central aperture of sufficient size to allow it to slip over the spout A, and this device serves to withdraw the can from the spout after it is filled. A flattened bar, t, rests upon the bottom of the plate G, and its opposite end is connected with a crank or rocker arm, u, which is operated from the same shaft with the lever V and pushes the bar t forward beneath the can just as it is deposited upon the plate by the carrier. This movement lifts the can so that it will be guided upon the spout A with certainty.

The plunger B, by which the fish is forced out of the measuring-chamber into the pan, has a rod, v, extending from its outer end through a guide, and a screw, w, which is adjustable in this guide-plate, limits and adjusts the outward movement of the plunger. The rod v is connected with an arm, x, which projects from the end of the lever U, by a link, y, and the arm x is made to lengthen or shorten upon the lever U, so as to increase or diminish the throw of the plunger B. The lever U is actuated by the cam T, as before stated. This, with the set-screw w, adjusts the length of the measure and the length of the stroke of the plunger B. After the fish has been forced into the can by the plunger B the can begins to move off from the spout A at a rate of speed not quite equal to the forward movement of the plunger B, which still continues to follow it, and thus completes the operation of pressing the fish into the can at a reduced speed, which enables any air still remaining within the can to escape before the plunger is finally withdrawn and the can discharged.

Having thus described my invention, what I claim as new, and desire to secure by Letters Patent, is—

1. The receiving-hopper H, with the semi-cylindrical rotary back E, in combination with the forks f, attached to an arm in the rear, so as to be projected forward into the contents of the hopper, and a mechanism by which the part E may be moved downward while the forks are projected through it, substantially as herein described.

2. The hopper H, with its semi-cylindrical back E, mounted upon a shaft, as shown, and forks f, in combination with the cam N, lever O, and connecting-rod d, substantially as herein described.

3. The hopper H, with its curved rotary back E and operating mechanism, in combination with the forks f, projecting through the part E, the arm D, lever V, and the actuating-cam J and lever K, with the intervening connecting devices, substantially as herein described.

4. The rotary back E of the hopper, and the forks f, with a mechanism for projecting them forward into the hopper and withdrawing them from it, in combination with the roller g, through which the forks pass and by which they are guided, substantially as herein described.

5. The rotary back E of the hopper H, with the reciprocating forks f, and the cam N and lever O, by which the part E is caused to oscillate, in combination with lever P, to which the lever O is fulcrumed, and the suspended weight P', substantially as herein described.

6. The rotary back E of the hopper H, with the cam N, rock-shaft or lever O, and forks f, in combination with the connecting-rod d, with the screw and adjusting-nuts d', or equivalent extension device, substantially as herein described.

7. The hopper H, with its rotary oscillating back E, and the forks f, operating as shown, in combination with a measuring-chamber below the hopper, and the horizontally-moving knives j and k, to sever the material and form a top to the chamber, substantially as herein described.

8. The hopper H, with a means for forcing the material into a measuring-chamber below, and the knives j k, to sever the surplus material, in combination with the moving wall C, by which the material is compressed within the chamber, and end-gate n, substantially as herein described.

9. The hopper H, with a device for forcing material into a measuring-chamber below, and the knives j k, as shown, in combination with the moving wall C and end-gate n, and the cam R, lever S, and the connecting-rod l, substantially as herein described.

10. The moving wall C of the measuring-chamber, and end-gate n, the cam R, and the lever S, in combination with the connecting-rod l, having screw-threads upon its end, and the adjusting-nuts m, substantially as herein described.

11. The hopper H, with its movable forks or forcing devices, the measuring-chamber with its movable wall C, and the knives j k, in combination with the sliding end-gate n and its operating-lever M, substantially as herein described.

12. The hopper H, with the forks $f$, the measuring-chamber with its movable wall C, knives $j$ $k$, and the gate $n$, in combination with the reciprocating plunger B, for discharging the material from the chamber, substantially as herein described.

13. The reciprocating plunger B, with the extension $v$ and the link $x$, in combination with the lever U, having the adjustable extension $y$, and the cam T, substantially as herein described.

14. The plunger B and the cam T, with the extension-lever U $y$ and connecting-link $x$, as shown, in combination with the adjusting-screw $w$, by which the outward movement of the plunger is limited or regulated, substantially as herein described.

15. The hopper H, with the measuring-chamber below, and the plunger B, in combination with the spout A, to receive the cans, said spout having its end inclined or beveled, substantially as herein described.

16. The spout A, upon which the cans are placed to be filled, said spout having its end inclined and the top or longest side flattened to form an air-passage, substantially as herein described.

17. The spout A, projecting from the measuring-chamber to receive the cans to be filled, in combination with the plate or slide G, upon which the cans are supported, and a mechanism by which the plate is moved beneath the spout or retracted from it, substantially as herein described.

18. The plate or slide G, with a mechanism by which it is moved toward the spout A and retracted therefrom, in combination with the arm or bar $t$ and the rocker-arm $u$, by which it is caused to move beneath and raise the can to guide it upon the spout A, substantially as herein described.

19. The reciprocating plate G, with the standard $s$ at its outer end and the annular standard $s'$ at the inner end, so formed as to slide upon the spout A in advance of the can and remove it when the slide is retracted, substantially as herein described.

20. The inclined chute I, with the concave curved portion I', and the reciprocating slide or plate G, in combination with the rotary feeder or carrier F, journaled above the plate G, and having open spaces to receive the cans and carry them from the chute to the plate, and thence to the discharge, substantially as herein described.

21. The rotary carrier or feeder F, journaled above the plate G, and having the pins $o$ projecting from its ends, in combination with the notched stationary and reciprocating arms $p$ $p'$, substantially as and for the purpose herein described.

22. The rotary carrier or feeder F, journaled above the plate G and having the pins $o$ projecting from its ends, in combination with the stationary notched arm $p'$ and the arm $p$, with the lever K, cam J, rocker-arm Q, and connecting-rod $q$, substantially as herein described.

In witness whereof I hereunto set my hand.

MATHIAS JENSEN.

Witnesses:
C. W. FULTON.
J. A. FULTON